US010454557B1

(12) United States Patent
Tsai et al.

(10) Patent No.: US 10,454,557 B1
(45) Date of Patent: Oct. 22, 2019

(54) WIRELESS TRANSMITTING DEVICE, REFERENCE SIGNAL TRANSMISSION METHOD AND COVER CODE GENERATION DEVICE

(71) Applicant: Institute For Information Industry, Taipei (TW)

(72) Inventors: Tsung-Yu Tsai, Tainan (TW); Chin-Gwo Ma, New Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/212,657

(22) Filed: Dec. 6, 2018

(30) Foreign Application Priority Data

Oct. 17, 2018 (TW) .............................. 107136550 A

(51) Int. Cl.
*H04B 7/06* (2006.01)
*H04L 5/00* (2006.01)
*H04L 27/26* (2006.01)

(52) U.S. Cl.
CPC ......... *H04B 7/0634* (2013.01); *H04L 5/0048* (2013.01); *H04L 5/0098* (2013.01); *H04L 27/2628* (2013.01)

(58) Field of Classification Search
CPC ... H04B 7/0634; H04L 5/0048; H04L 5/0098; H04L 27/2628
See application file for complete search history.

(56) References Cited

U.S. PATENT DOCUMENTS

| | | | |
|---|---|---|---|
| 2011/0134849 A1* | 6/2011 | Lee ..................... | H04B 7/0671 370/328 |
| 2013/0028241 A1* | 1/2013 | Wang .................. | H04L 25/0228 370/336 |
| 2014/0135049 A1* | 5/2014 | Hirata .................. | H04W 28/16 455/501 |
| 2014/0192756 A1* | 7/2014 | Baldemair ............. | H04L 5/001 370/329 |
| 2015/0304076 A1* | 10/2015 | Lee ....................... | H04L 5/005 370/329 |

* cited by examiner

*Primary Examiner* — Sophia Vlahos
(74) *Attorney, Agent, or Firm* — Skaar Ulbrich Macari, P.A.

(57) ABSTRACT

A method for transmitting reference signals includes: determining, by a wireless transmitting device, a first vector set used for calculating a first vector subspace that includes a channel frequency response vector corresponding to a subcarrier; calculating, by the wireless transmitting device, a second vector set including several second vectors derived from performing dot product operations to each vector in the first vector set with a conjugate vector of each vector in the first vector set; calculating, by the wireless transmitting device, a null space of a second vector subspace spanned by the second vector set and determining, by the wireless transmitting device, a cover code from the null space; and transmitting a first reference signal and a second reference signal which is a dot product of the first reference signal and the cover code on the subcarrier from the wireless transmitting device to a wireless receiving device.

18 Claims, 3 Drawing Sheets

WIRELESS TRANSMITTING DEVICE, REFERENCE SIGNAL TRANSMISSION METHOD AND COVER CODE GENERATION DEVICE

PRIORITY

This application claims priority to Taiwan Patent Application No. 107136550 filed on Oct. 17, 2018, which is hereby incorporated by reference in its entirety.

FIELD

The present disclosure relates to a communication device and a communication method. More particularly, the present disclosure relates to a cover code generation device, a wireless transmitting device comprising the cover code generation device and a reference signal transmission method generating and using the cover code.

BACKGROUND

Data decoding in various wireless communication systems usually needs to use channel estimation (CE) to achieve coherent decoding. Common channel estimation generally utilizes a wireless transmitting device to transmit a reference signal known by a given wireless receiving device, and then the wireless receiving device estimates the channel frequency response (CFR) of the wireless channel based on the received reference signal.

In order to increase the communication capacity, the wireless transmitting device may distribute multiple reference signals to the same subcarrier in a superimposed manner, and use multiple antennas to transmit these reference signals. Because the multiple reference signals are transmitted on the same subcarrier, interference will occur between these superimposed reference signals. In this way, the wireless receiving device cannot distinguish these reference signals from the received signal and thus cannot perform channel estimation according to the respective reference signals. It is known that cover code can be adopted to solve the aforesaid problem. Adopting cover code is to utilize a specific code to cover a certain reference signal so as to reduce the interference generated by the reference signal superimposed with another reference signal.

Taking the $5^{th}$ Generation New Radio (5G NR) communication system as an example, the cover code adopted is an alternative sequence vector, e.g., a vector represented as [1, −1, 1, −1, 1, . . . , 1, −1]. However, under the influence of wireless channel, it is possible that such an alternative sequence cannot completely reduce the interference between the multiple superimposed reference signals, and thus the wireless receiving device still cannot effectively distinguish these reference signals from the received signals. In this case, error floor will inevitably occur to the channel estimation, thereby influencing the decoding performance of the wireless receiving device.

Accordingly, it is important in the art to enable the wireless receiving device to more effectively distinguish the multiple reference signals transmitted on the same subcarrier from the received signals.

SUMMARY

Provided is a wireless transmitting device. The wireless transmitting device may comprise a processor, and a storage and a transceiver electrically connected with the processor. The processor may be configured to determine a first vector set for spanning a first vector subspace. The first vector subspace comprises a channel frequency response vector corresponding to a subcarrier, and the first vector set is a non-full-rank matrix. The processor may also be configured to calculate a second vector set comprising a plurality of second vectors. The plurality of second vectors are derived from performing a dot-product operation to each first vector in the first vector set with a conjugate vector of each first vector in the first vector set. The processor may also be configured to calculate a null space of a second vector subspace spanned by the second vector set. The processor may also be configured to determine a cover code from the null space. The storage may be configured to store the cover code. The transceiver may be configured to transmit a first reference signal and a second reference signal which is a dot product of the first reference signal and the cover code to a wireless receiving device on the subcarrier.

Also provided is a method for transmitting reference signals. The method for transmitting reference signals may comprise:

determining, by a wireless transmitting device, a first vector set for spanning a first vector subspace, wherein the first vector subspace comprises a channel frequency response vector corresponding to a subcarrier, and the first vector set is a non-full-rank matrix;

calculating, by the wireless transmitting device, a second vector set comprising a plurality of second vectors, wherein the plurality of second vectors are derived from performing a dot-product operation to each first vector in the first vector set with a conjugate vector of each first vector in the first vector set;

calculating, by the wireless transmitting device, a null space of a second vector subspace spanned by the second vector set;

determining, by the wireless transmitting device, a cover code from the null space; and transmitting, by the wireless transmitting device, a first reference signal and a second reference signal to a wireless receiving device on the subcarrier, wherein the second reference signal is a dot product of the first reference signal and the cover code.

Further provided is a cover code generation device. The cover code generation device may comprise a processor and a storage electrically connected with the processor. The processor may be configured to determine a first vector set for spanning a first vector subspace. The first vector subspace comprises a channel frequency response vector corresponding to a subcarrier, and the first vector set is a non-full-rank matrix. The processor may be further configured to calculate a second vector set comprising a plurality of second vectors. The plurality of second vectors are derived from performing a dot-product operation to each first vector in the first vector set with a conjugate vector of each first vector in the first vector set. The processor may be further configured to calculate a null space of a second vector subspace spanned by the second vector set. The processor may also be configured to determine a cover code from the null space. The storage may be configured to store the cover code.

The wireless receiving device can effectively distinguish the reference signals from the received signals as long as these reference signals transmitted on the same subcarrier by the wireless transmitting device are orthogonal to each other after passing through the wireless channel, i.e., the inner product of these reference signals which have passed through the wireless channel is zero. As can be known from the later description, the inner product of the first reference signal and the second reference signal that have passed through the wireless channel can be zero as long as the content of the cover code is derived from the null space of the aforesaid second vector subspace. In this case, the wireless receiving device can effectively distinguish the aforesaid first reference signal and the aforesaid second reference signal from the received signals.

What described above is not intended to limit the present invention, but only provide preliminary understanding to those of ordinary skill in the art, which includes one or more technical problems to be solved, one or more technical solutions for the problems with one or more technical effects. According to the attached drawings and the embodiments recited in the following detailed description, those of ordinary skill in the art can further understand the details of the present invention.

DETAILED DESCRIPTION

The example embodiments of the present invention described below are not intended to limit the present invention to any specific examples, embodiments, environments, applications, structures, processes or steps described in these example embodiments. In the attached drawings, elements not directly related to the embodiments of the present invention are omitted from depiction but may still be implied in the attached drawings. Dimensions of elements and proportional relationships among individual elements in the attached drawings are only exemplary examples but not intended to limit the present invention. Unless stated particularly, same (or similar) element symbols may correspond to same (or similar) elements in the following description. Unless stated particularly, the number of each element described hereinafter refers to one or more while it can be implemented.

Figure 1:
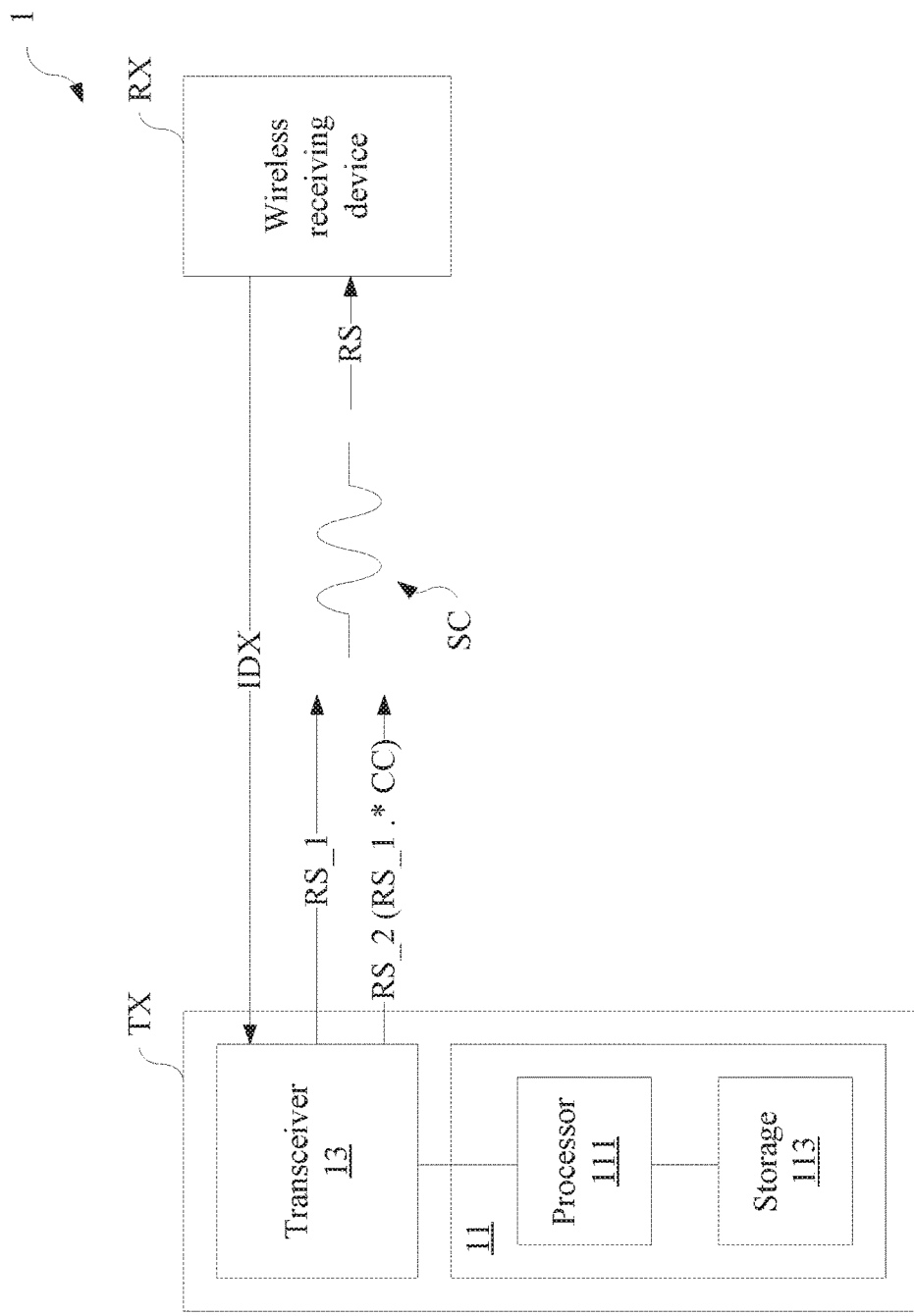
FIG. 1 illustrates a schematic view of a wireless communication system according to some embodiments.

FIG. 1 illustrates a schematic view of a wireless communication system according to some embodiments. However, the contents illustrated in FIG. 1 are only used for describing the embodiments of the present invention instead of limiting the present invention.

Referring to FIG. 1, a wireless communication system 1 may comprise a wireless transmitting device TX and a wireless receiving device RX therein. The wireless transmitting device TX may basically comprise a cover code generation device 11 and a transceiver 13, and the cover code generation device 11 may basically comprise a processor 111 and a storage 113. The processor 111 is electrically connected with the storage 113 and the transceiver 13. The processor 111 may be electrically connected with the storage 113 and the transceiver 13 not via other elements (i.e., via direction electrical connection). The processor 111 may also be electrically connected with the storage 113 and the transceiver 13 via other elements (i.e., via indirection electrical connection).

The storage 113 may be configured to store various data generated by the cover code generation device 11. The storage 113 may comprise a primary memory (which is also called a main memory or internal memory), and the processor 111 may directly read instruction sets stored in the primary memory, and execute these instruction sets if needed. The storage 113 may optionally comprise a secondary memory (which is also called an external memory or auxiliary memory), and the memory at this level may use a data buffer to transmit data stored to the primary memory. For example, the secondary memory may for example be a hard disk, an optical disk or the like, without being limited thereto. The storage 113 may optionally comprise a third-level memory, i.e., a storage device that can be inserted into or pulled out from a computer directly, e.g., a mobile disk.

The transceiver 13 may be configured to communicate with the wireless receiving device RX. The transceiver 13 comprises a transmitter and a receiver. For example, the transceiver 13 may comprise communication elements such as an antenna, an amplifier, a modulator, a demodulator, a detector, an analog to digital converter, a digital to analog converter or the like, without being limited thereto.

In some embodiments, the transceiver 13 may comprise multiple antennas to increase data transmission amount or achieve the effect of simultaneously transmitting/receiving multiple pieces of data. Therefore, the transceiver 13 may superimpose a first reference signal RS_1 and a second reference signal RS_2 onto a subcarrier SC, and use two antennas to simultaneously transmit the two reference signals to the wireless receiving device RX on the same subcarrier SC. In some embodiments, the transceiver 13 may also superimpose the first reference signal RS_1 and the second reference signal RS_2 onto a subcarrier SC, but use a single antenna to simultaneously transmit the two reference signals to the wireless receiving device RX on the same subcarrier SC.

The processor 111 may be any of various microprocessors or microcontrollers capable of signal processing. The microprocessor or the microcontroller is a kind of programmable specific integrated circuit that is capable of operating, storing, outputting/inputting or the like. Moreover, the microprocessor or the microcontroller can receive and process various coded instructions, thereby performing various logical operations and arithmetical operations and outputting corresponding operation results. The processor 111 may be programmed to execute various operations or programs in the wireless transmitting device TX.

Taking the case where the first reference signal RS_1 and the second reference signal RS_2 are simultaneously transmitted on the subcarrier SC as an example, the processor 111 may be configured to generate a cover code and determine patterns of the first reference signal RS_1 and the second reference signal RS_2, wherein the second reference signal RS_2 is a dot product of the first reference signal RS_1 and the cover code. The storage 113 may be configured to store the cover code generated by the processor 111.

After generating the first reference signal RS_1 and the second reference signal RS_2, the transceiver 13 may superimpose the first reference signal RS_1 and the second reference signal RS_2 onto the subcarrier SC and transmit the reference signals to the wireless receiving device RX on the subcarrier SC. The received signals RS received by the wireless receiving device RX may be represented as follows:

$$RS = H1.*RS\_1 + H2.*RS\_2 \qquad \text{(Formula 1)}$$

wherein:

"H1" represents a first channel frequency response vector H1 corresponding to the first reference signal RS_1 (not shown in the drawings);

"H2" represents a second channel frequency response vector H2 corresponding to the second reference signal RS_2 (not shown in the drawings); and ".*" represents the dot-product operation.

Since the second reference signal RS_2 is a dot product of the first reference signal RS_1 and the cover code CC, Formula 1 can be modified into:

$$RS=H1.*RS\_1+H2.*RS\_1.*CC \quad \text{(Formula 2)}$$

The first reference signal RS_1 is a known vector, so it does not affect the subsequent deduction. Therefore, for simplification of the description, it is assumed that the first reference signal RS_1 is a unit vector, i.e., [1, 1, 1, ..., 1]. Accordingly, Formula 2 may be simplified into:

$$RS=H1+H2.*CC \quad \text{(Formula 3)}$$

In order to enable the wireless receiving device RX to distinguish "H1" and "H2.*CC" from the received signals RS (here, the first reference signal RS_1 is a unit vector), the inner product of "H1" and "H2.*CC" may be made to be zero, i.e., represented as follows:

$$<H2.*CC,H1>=0 \quad \text{(Formula 4)}$$

In order to distinguish the cover code CC from the first channel frequency response vector 111 and the second channel frequency response vector H2, the inner product operation in Formula 4 may be equivalently replaced as follows:

$$CC^+\cdot(H2*.*H1)=0 \quad \text{(Formula 5)}$$

wherein:

"$CC^+$" represents the conjugate transposed vector of the cover code CC, i.e., the Hermitian Conversion of the cover code CC;

"·" represents the matrix multiplication; and

"H2*" represents the conjugate vector of the second channel frequency response vector H2.

As can be known from Formula 5, the conjugate transposed vector of the cover code CC (i.e., "$CC^+$") enables the element in the subspace spanned by "H2*.*H1" to correspond to the element "0" in the codomain, i.e., the null space of the subspace comprises "$CC^+$". Correspondingly, the null space of the subspace also comprises the conjugate transposed vector of "$CC^+$", i.e., the cover code CC. In other words, the inner product of "H1" and "H2.*CC" being zero can be satisfied, i.e., Formula 4 and Formula 5 can be satisfied as long as the cover code CC is derived from the null space of the subspace spanned by "H2*.*H1".

Figure 2:
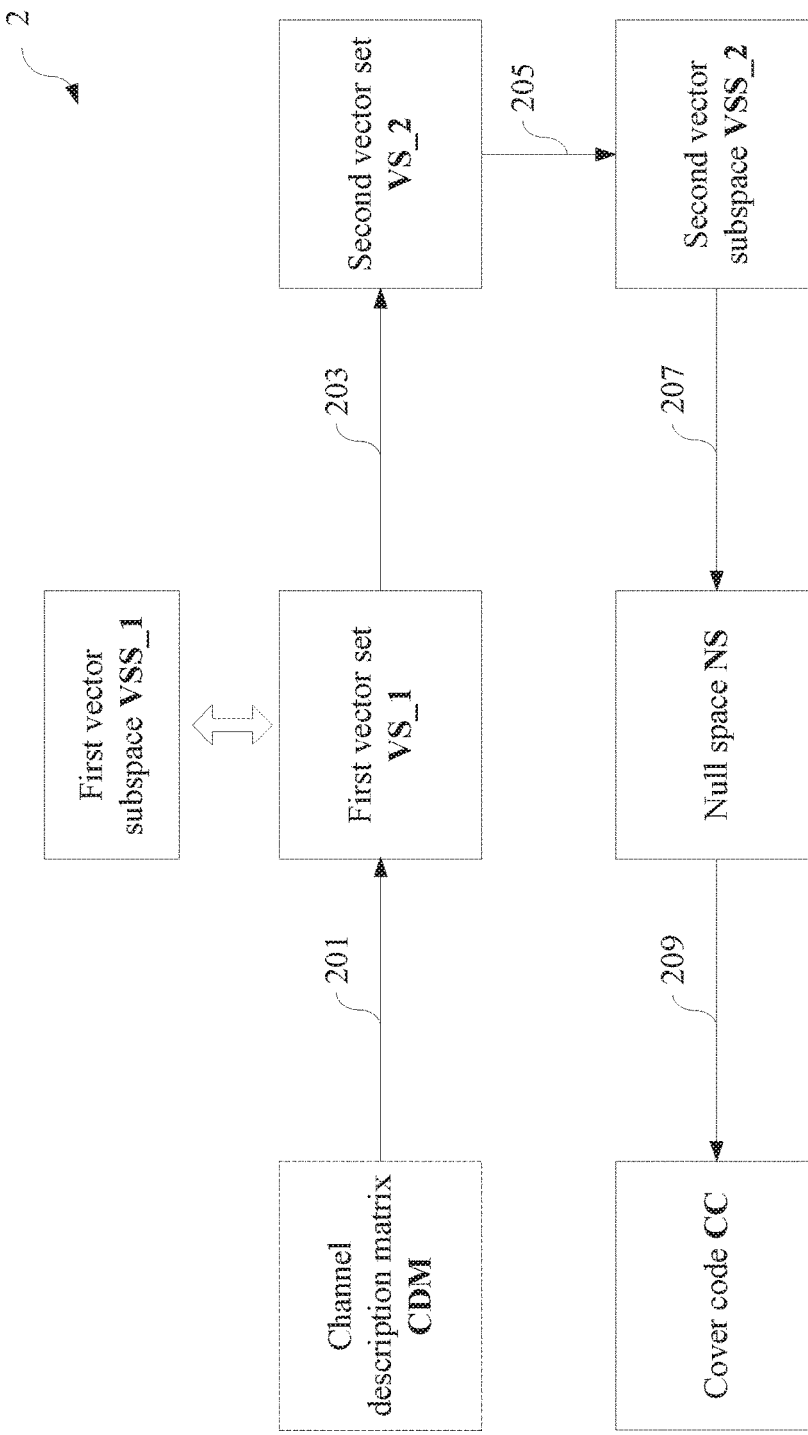
FIG. 2 illustrates a schematic view of a cover code generation process according to some embodiments.

FIG. 2 illustrates a schematic view of a cover code generation process 2 according to some embodiments. However, the contents illustrated in FIG. 2 are only used for describing the embodiments of the present invention instead of limiting the present invention.

Referring to FIG. 1 and FIG. 2 together, in some embodiments, the processor 111 may first determine a first vector set VS_1 for spanning a first vector subspace VSS_1 (i.e., shown as operation 201). For example, the processor 111 may define a channel description matrix CDM according to a preset channel model and then determine the first vector set VS_1 according to the channel description matrix CDM. For example, the first vector set VS_1 is derived from column vectors of the channel description matrix CDM. The channel description matrix CDM is any matrix that can be used to describe a wireless channel that a reference signal passes through when it is transmitted by the wireless transmitting device TX to the wireless receiving device RX.

In some embodiments, if the wireless communication system 1 is an orthogonal frequency-division multiplexing (OFDM) system, then the channel description matrix CDM may be a Discrete Fourier Transform (DFT) matrix.

According to different system designs and/or characteristics of different wireless channels, in the DFT matrix, elements related to the first channel frequency response vector H1 and the second channel frequency response vector H2 may also vary. In other words, not all the elements in the DFT matrix are related to the first channel frequency response vector H1 and the second channel frequency response vector H2. Therefore, in some embodiments, the processor 111 may discard elements that are unrelated to the first channel frequency response vector H1 and the second channel frequency response vector H2 from the DFT matrix, thereby deriving a submatrix. Also the processor 111 uses the submatrix instead of the whole DFT matrix as the channel description matrix CDM. For example, the processor 111 may select a low-rank 6×4 matrix from the 512×512 DFT matrix as the channel description matrix CDM.

In some embodiments, the processor 111 may also perform a singular value decomposition (SVD) conversion on the DFT matrix or the submatrix, and select a left singular matrix generated after the conversion as the channel description matrix CDM. In some embodiments, the processor 111 may further reduce the size of the left singular matrix according to the singular value of the DFT matrix or the submatrix. For example, if the first "L" diagonal elements of a middle matrix after the singular decomposition have occupied a predetermined proportion (e.g., 95%) of the whole diagonal elements, the processor 111 may select the first "L" column vectors from the left singular matrix as the channel description matrix CDM, instead of using the whole left singular matrix as the channel description matrix CDM.

The first vector set VS_1 that is capable of spanning the first vector subspace VSS_1 is substantially equivalent to a basis of the first vector subspace VSS_1. In this case, any channel frequency response vector (e.g., the first channel frequency response vector H1 or the second channel frequency response vector H2) corresponding to the subcarrier SC may be represented as a set of vectors in the first vector subspace VSS_1, and may be formed from the first vector set VS_1. The first vector set VS_1 comprises multiple vectors, and these vectors may be represented as a matrix, and the matrix is a non-full-rank matrix, i.e., the first vector set VS_1 is not a full-rank matrix. When the first vector set VS_1 is a non-full-rank matrix, a null space NS of the second vector subspace VSS_2 exists.

Taking the case where the first reference signal RS_1 and the second reference signal RS_2 are simultaneously transmitted on the subcarrier SC as an example, the processor 111 may calculate a second vector set VS_2 (i.e., shown as operation 203). The second vector set VS_2 comprises a plurality of second vectors that are derived from performing a dot-product operation to each first vector in the first vector set VS_1 with a conjugate vector of each first vector in the first vector set VS_1, i.e., the operation result of "H2*.*H1" in Formula 5. Thereafter, the processor 111 may calculate a second vector subspace VSS_2 spanned by the second vector set VS_2 (i.e., shown as operation 205), and calculate a null space NS of the second vector subspace VSS_2 (i.e., shown as operation 207). Finally, the processor 111 may determine one or more cover codes CC from the null space NS (i.e., shown as operation 209). As described above, since the cover code CC is derived from the null space of the subspace spanned by "H2*.*H1", it can satisfy the inner product of "H1." and "H2.*CC" being zero, i.e., satisfying Formula 4 and Formula 5.

In some embodiments, the wireless receiving device RX may transmit a cover code index IDX to the transceiver 13 of the wireless transmitting device TX according to requirements thereof or in response to conditions of the environment where the wireless receiving device RX is located (for example but not limited to: the channel model, the delay spread, the filter bandwidth, the subcarrier spacing of the wireless communication system 1 or the like). Thereafter, the processor 111 may select one zero vector from the multiple zero vectors of the null space as the cover code CC according to the cover code index IDX received by the transceiver 13. Additionally, in some embodiments, the wireless receiving device RX may also transmit various information of the wireless channel to the wireless transmitting device TX so that the wireless transmitting device TX can define the channel description matrix CDM according to such information.

Figure 3:
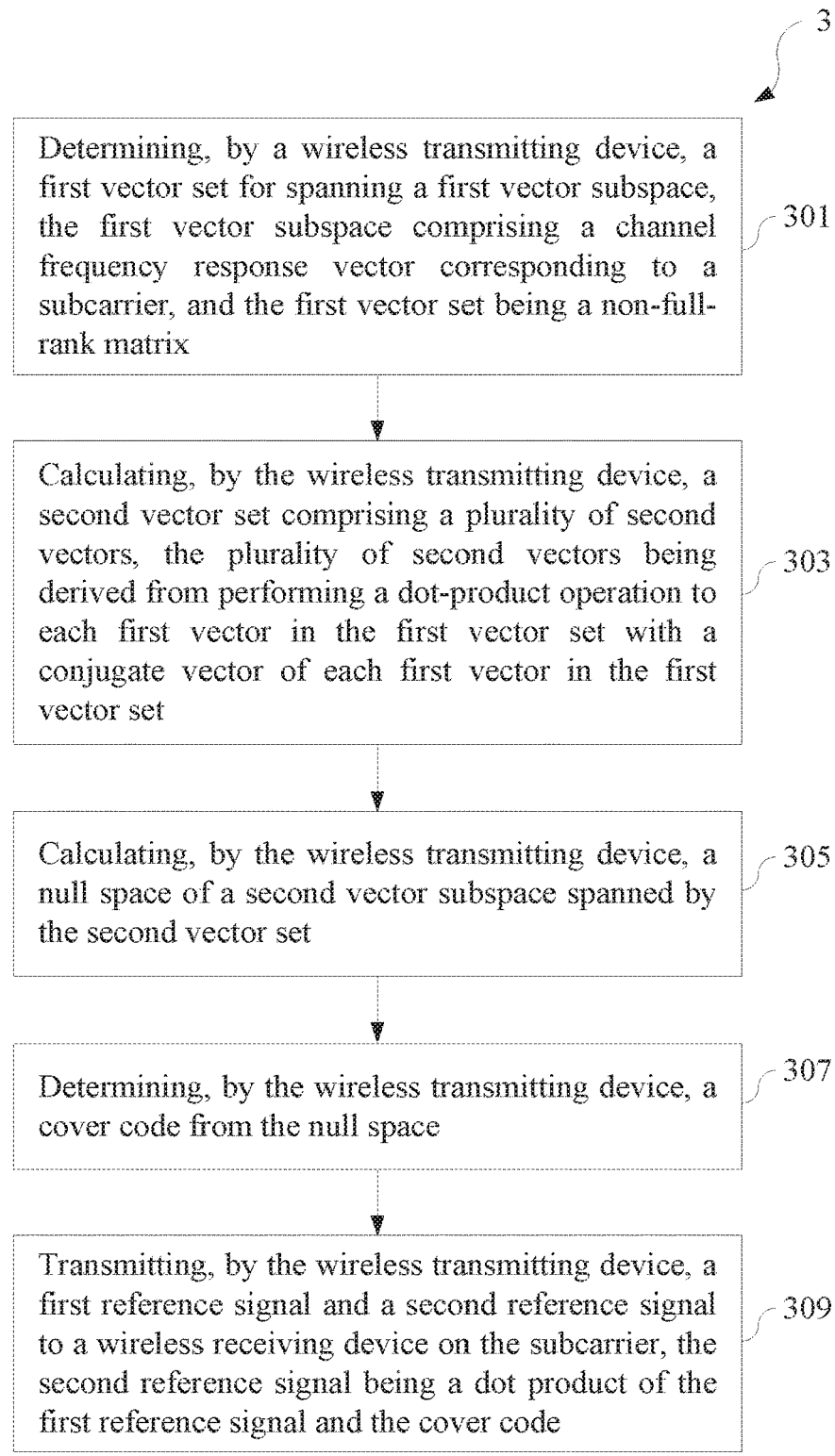
FIG. 3 illustrates a schematic view of a method for transmitting reference signals according to some embodiments.

FIG. 3 illustrates a schematic view of a method for transmitting reference signals according to some embodiments. However, the contents illustrated in FIG. 3 are only used for describing the embodiments of the present invention instead of limiting the present invention.

Referring to FIG. 3, a method 3 for transmitting reference signals may comprise the following steps:

determining, by a wireless transmitting device, a first vector set for spanning a first vector subspace, wherein the first vector subspace comprises a channel frequency response vector corresponding to a subcarrier, and the first vector set is a non-full-rank matrix (which is labeled as a step 301);

calculating, by the wireless transmitting device, a second vector set comprising a plurality of second vectors, wherein the plurality of second vectors are derived from performing a dot-product operation to each first vector in the first vector set with a conjugate vector of each first vector in the first vector set (which is labeled as step 303);

calculating, by the wireless transmitting device, a null space of a second vector subspace spanned by the second vector set (which is labeled as step 305);

determining, by the wireless transmitting device, a cover code from the null space (which is labeled as step 307); and transmitting, by the wireless transmitting device, a first reference signal and a second reference signal to a wireless receiving device on the subcarrier, wherein the second reference signal is a dot product of the first reference signal and the cover code (which is labeled as step 309).

The order in which the steps 301 to 309 of FIG. 3 are executed is not limited. The order in which the steps 301 to 309 of FIG. 3 are executed may be arbitrarily adjusted while it can be implemented.

In some embodiments, the method 3 for transmitting reference signals may further comprise the following step of: defining, by the wireless transmitting device, a channel description matrix according to a channel model; wherein the first vector set is derived from column vectors of the channel description matrix.

In some embodiments, the method 3 for transmitting reference signals may further comprise the following step of: defining, by the wireless transmitting device, a channel description matrix according to a channel model; wherein the first vector set is derived from column vectors of the channel description matrix. Besides, the channel description matrix may be a DTF matrix.

In some embodiments, the method 3 for transmitting reference signals may further comprise the following step of: defining, by the wireless transmitting device, a channel description matrix according to a channel model; wherein the first vector set is derived from column vectors of the channel description matrix. Besides, the channel description matrix may be a submatrix of a DTF matrix.

In some embodiments, the method 3 for transmitting reference signals may further comprise the following step of: defining, by the wireless transmitting device, a channel description matrix according to a channel model; wherein the first vector set is derived from column vectors of the channel description matrix. Besides, the channel description matrix may be a left singular matrix of a submatrix of a DTF matrix.

In some embodiments, the method 3 for transmitting reference signals may further comprise the following step of: receiving, by the wireless transmitting device, a cover code index from the wireless receiving device; wherein the wireless transmitting device determines the cover code from the null space according to the cover code index.

In some embodiments, all of the aforesaid steps of the method 3 for transmitting reference signals may be executed by the wireless transmitting device TX. In addition to the aforesaid steps, the method 3 for transmitting reference signals may also comprise other steps corresponding to all the aforesaid embodiments of the wireless transmitting device TX. These other steps shall be appreciated by those of ordinary skill in the art based on the above description for the wireless transmitting device TX, and thus will not be further described herein.

The above disclosure is related to the detailed technical contents and inventive features thereof. Those of ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless transmitting device, comprising:
    a processor, configured to:
        determine a first vector set for spanning a first vector subspace, the first vector subspace comprising a channel frequency response vector corresponding to a subcarrier, and the first vector set being a non-full-rank matrix;
        calculate a second vector set comprising a plurality of second vectors, the plurality of second vectors being derived from performing a dot-product operation to each first vector in the first vector set with a conjugate vector of each first vector in the first vector set;
        calculate a null space of a second vector subspace spanned by the second vector set; and
        determine a cover code from the null space;
    a storage, electrically connected with the processor, and configured to store the cover code; and
    a transceiver, electrically connected with the processor, and configured to transmit a first reference signal and a second reference signal to a wireless receiving device on the subcarrier, wherein the second reference signal is a dot product of the first reference signal and the cover code.

2. The wireless transmitting device of claim 1, wherein the processor is further configured to define a channel description matrix according to a channel model, and the first vector set is derived from column vectors of the channel description matrix.

3. The wireless transmitting device of claim 2, wherein the channel description matrix is a Discrete Fourier Transformation (DFT) matrix.

4. The wireless transmitting device of claim 2, wherein the channel description matrix is a submatrix of a Discrete Fourier Transformation matrix.

5. The wireless transmitting device of claim 2, wherein the channel description matrix is a left singular matrix of a submatrix of a Discrete Fourier Transformation matrix.

6. The wireless transmitting device of claim 1, wherein the transceiver is further configured to receive a cover code index from the wireless receiving device, and the processor determines the cover code from the null space according to the cover code index.

7. A method for transmitting reference signals, comprising:
   determining, by a wireless transmitting device, a first vector set for spanning a first vector subspace, the first vector subspace comprising a channel frequency response vector corresponding to a subcarrier, and the first vector set being a non-full-rank matrix;
   calculating, by the wireless transmitting device, a second vector set comprising a plurality of second vectors, the plurality of second vectors being derived from performing a dot-product operation to each first vector in the first vector set with a conjugate vector of each first vector in the first vector set;
   calculating, by the wireless transmitting device, a null space of a second vector subspace spanned by the second vector set;
   determining, by the wireless transmitting device, a cover code from the null space; and
   transmitting, by the wireless transmitting device, a first reference signal and a second reference signal to a wireless receiving device on the subcarrier, wherein the second reference signal is a dot product of the first reference signal and the cover code.

8. The method of claim 7, further comprising: defining, by the wireless transmitting device, a channel description matrix according to a channel model; wherein the first vector set is derived from column vectors of the channel description matrix.

9. The method of claim 8, wherein the channel description matrix is a Discrete Fourier Transformation matrix.

10. The method of claim 8, wherein the channel description matrix is a submatrix of a Discrete Fourier Transformation matrix.

11. The method of claim 8, wherein the channel description matrix is a left singular matrix of a submatrix of a Discrete Fourier Transformation matrix.

12. The method of claim 7, further comprising: receiving, by the wireless transmitting device, a cover code index from the wireless receiving device; wherein the wireless transmitting device determines the cover code from the null space according to the cover code index.

13. A cover code generation device, comprising:
   a processor, configured to:
      determine a first vector set for spanning a first vector subspace, the first vector subspace comprising a channel frequency response vector corresponding to a subcarrier, and the first vector set being a non-full-rank matrix;
      calculate a second vector set comprising a plurality of second vectors, the plurality of second vectors being derived from performing a dot-product operation to each first vector in the first vector set with a conjugate vector of each first vector in the first vector set;
      calculate a null space of a second vector subspace spanned by the second vector set; and
      determine a cover code from the null space; and
   a storage, electrically connected with the processor, and configured to store the cover code.

14. The cover code generation device of claim 13, wherein the processor is further configured to define a channel description matrix according to a channel model, and the first vector set is derived from column vectors of the channel description matrix.

15. The cover code generation device of claim 14, wherein the channel description matrix is a Discrete Fourier Transformation matrix.

16. The cover code generation device of claim 14, wherein the channel description matrix is a submatrix of a Discrete Fourier Transformation matrix.

17. The cover code generation device of claim 14, wherein the channel description matrix is a left singular matrix of a submatrix of a Discrete Fourier Transformation matrix.

18. The cover code generation device of claim 13, wherein the processor determines the cover code from the null space according to a cover code index.

\* \* \* \* \*